(12) United States Patent
Engehausen et al.

(10) Patent No.: US 9,614,929 B2
(45) Date of Patent: Apr. 4, 2017

(54) APPLICATION SERVER WITH AUTOMATIC AND AUTONOMIC APPLICATION CONFIGURATION VALIDATION

(75) Inventors: Jan Engehausen, Boeblingen (DE); Jean-Baptiste Joret, Leinfelden (DE); Timo Kussmaul, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 11/923,921

(22) Filed: Oct. 25, 2007

(65) Prior Publication Data

US 2008/0147675 A1    Jun. 19, 2008

(30) Foreign Application Priority Data

Dec. 19, 2006    (EP) .................................... 06126438

(51) Int. Cl.
*G06F 7/00*        (2006.01)
*G06F 17/30*       (2006.01)
*H04L 29/08*       (2006.01)
*G06F 9/445*       (2006.01)

(52) U.S. Cl.
CPC ................ *H04L 67/34* (2013.01); *G06F 8/60* (2013.01); *G06F 9/44505* (2013.01); *H04L 67/125* (2013.01)

(58) Field of Classification Search
CPC ..... G06F 8/60; G06F 9/44505; H04L 67/125; H04L 67/34
See application file for complete search history.

(56) References Cited

U.S. PATENT DOCUMENTS

| | | | |
|---|---|---|---|
| 6,847,970 B2* | 1/2005 | Keller et al. ................... | 707/100 |
| 6,954,756 B2* | 10/2005 | Arning .............. | G06F 17/30705 |
| 7,739,310 B1* | 6/2010 | Shmulevich et al. ........ | 707/802 |
| 2004/0049509 A1* | 3/2004 | Keller et al. ................... | 707/100 |
| 2004/0049565 A1* | 3/2004 | Keller et al. ................... | 709/223 |
| 2006/0123010 A1* | 6/2006 | Landry et al. .................. | 707/10 |
| 2007/0083630 A1* | 4/2007 | Roth et al. ..................... | 709/223 |
| 2008/0126406 A1* | 5/2008 | Endabetla et al. ........ | 707/103 R |
| 2010/0165993 A1* | 7/2010 | Basilier .................... | 370/395.53 |

* cited by examiner

*Primary Examiner* — Taelor Kim
(74) *Attorney, Agent, or Firm* — Ryan Lewis; Hoffman Warnick LLC

(57) ABSTRACT

A method and respective system for configuring an application program during its deployment in a network ready to be accessed by a remote client application via a network protocol such as TCP/IP. An application server processes a plurality of application components. The application program is based on an application template comprising the executable code of the application program, which template is configurable at least in part by an end-user by specifying a plurality of user-specific data defining the user-specific attributes adapting the application program to the needs of a specific end-user, for generating a user-specific application runtime instance.

16 Claims, 11 Drawing Sheets

Configuration Validation Control Flow

FIG.1 Prior Art Application Server

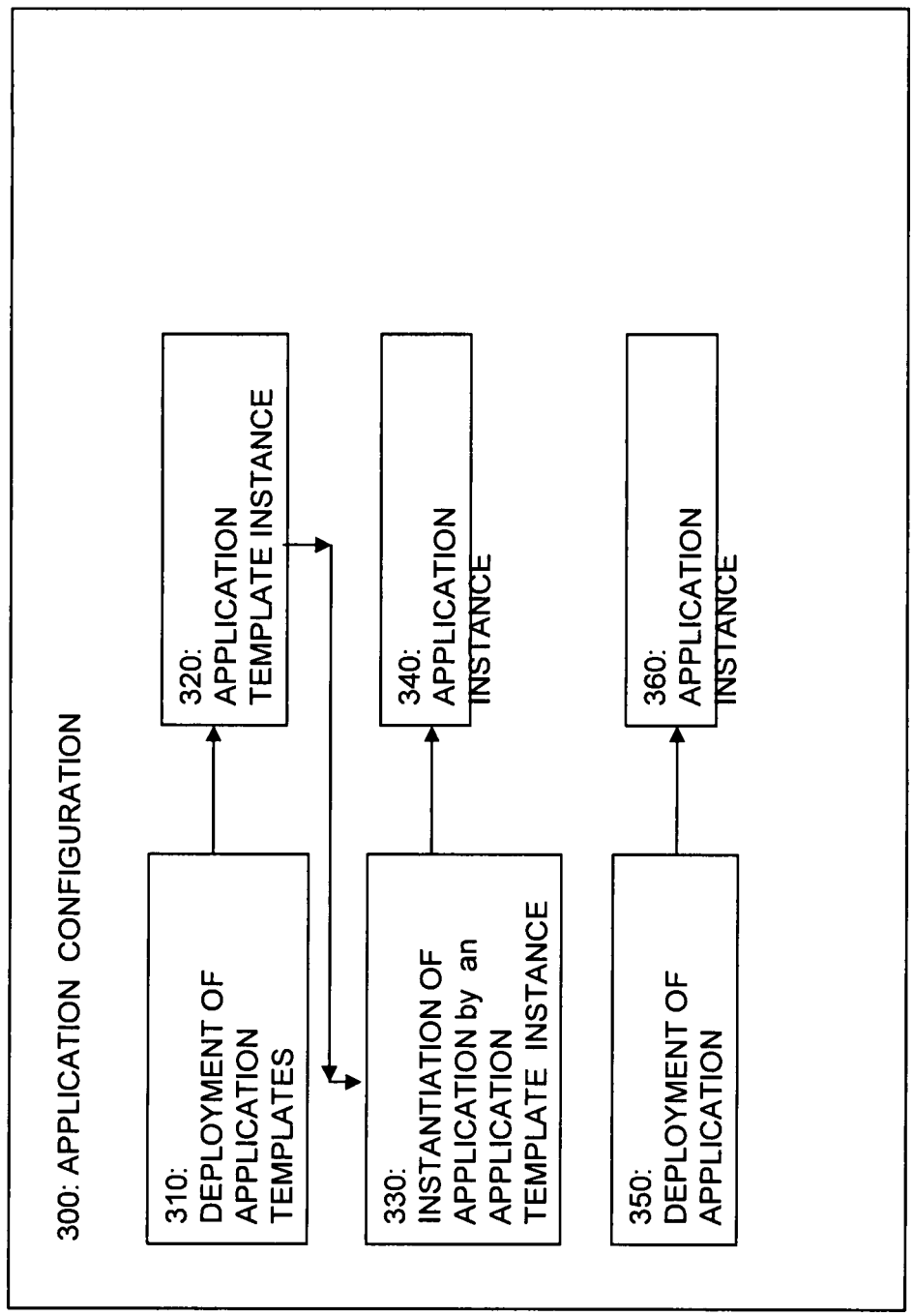

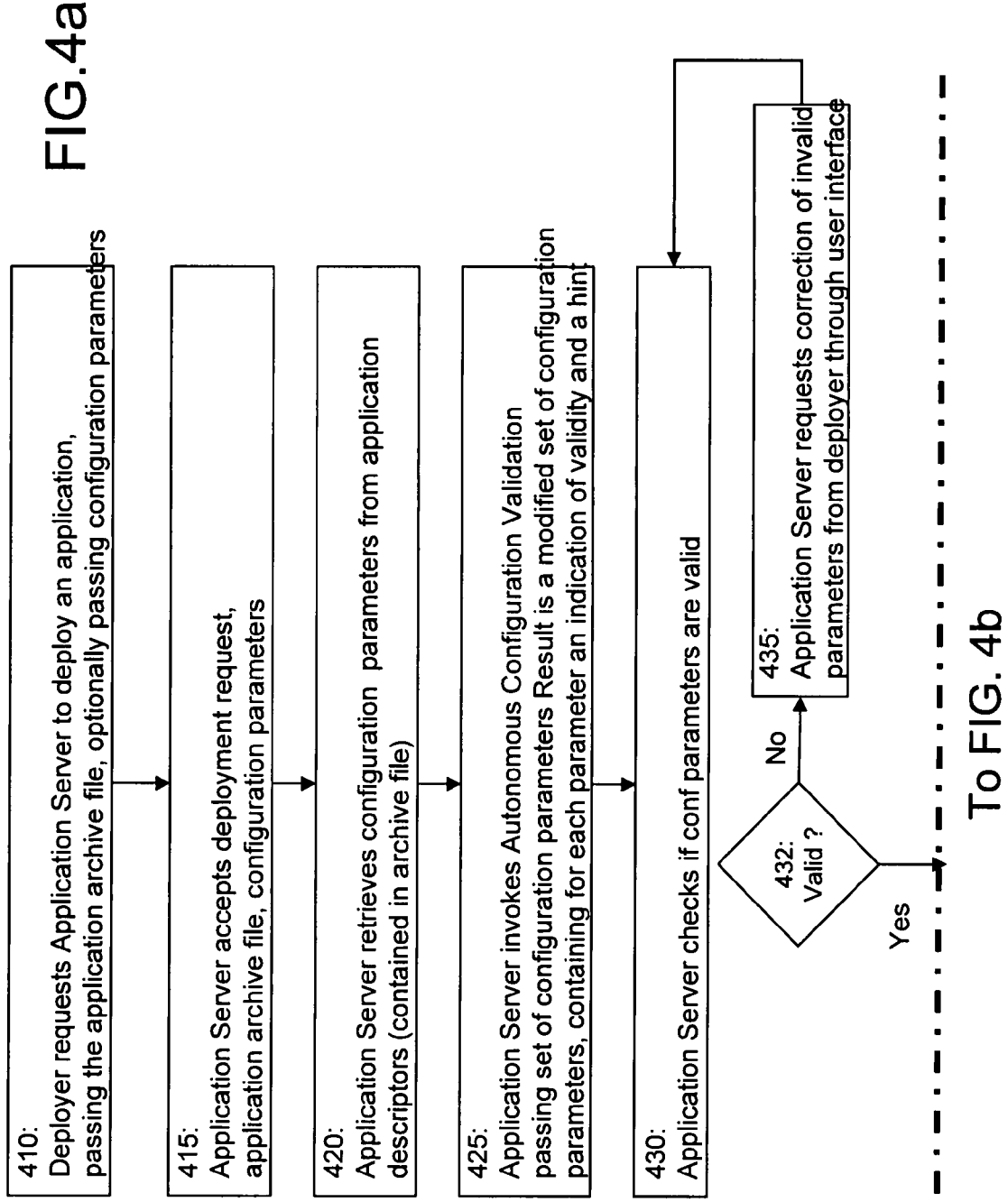

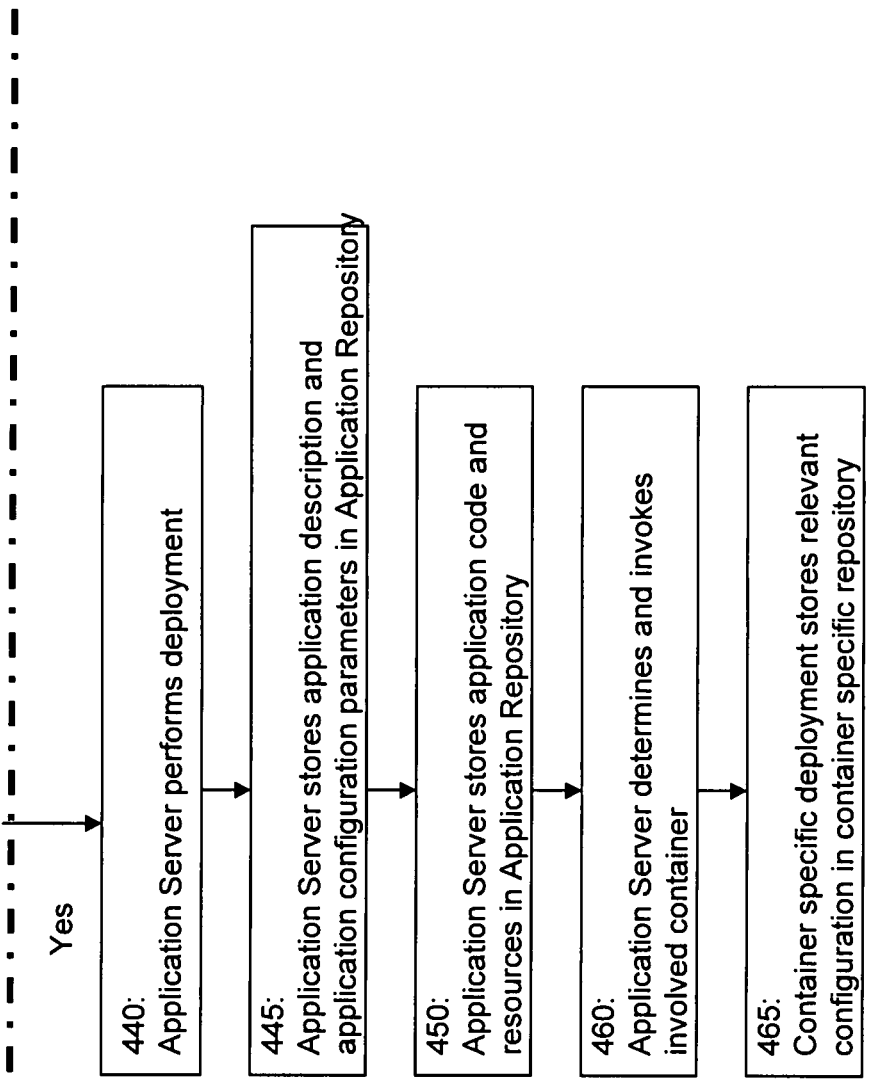

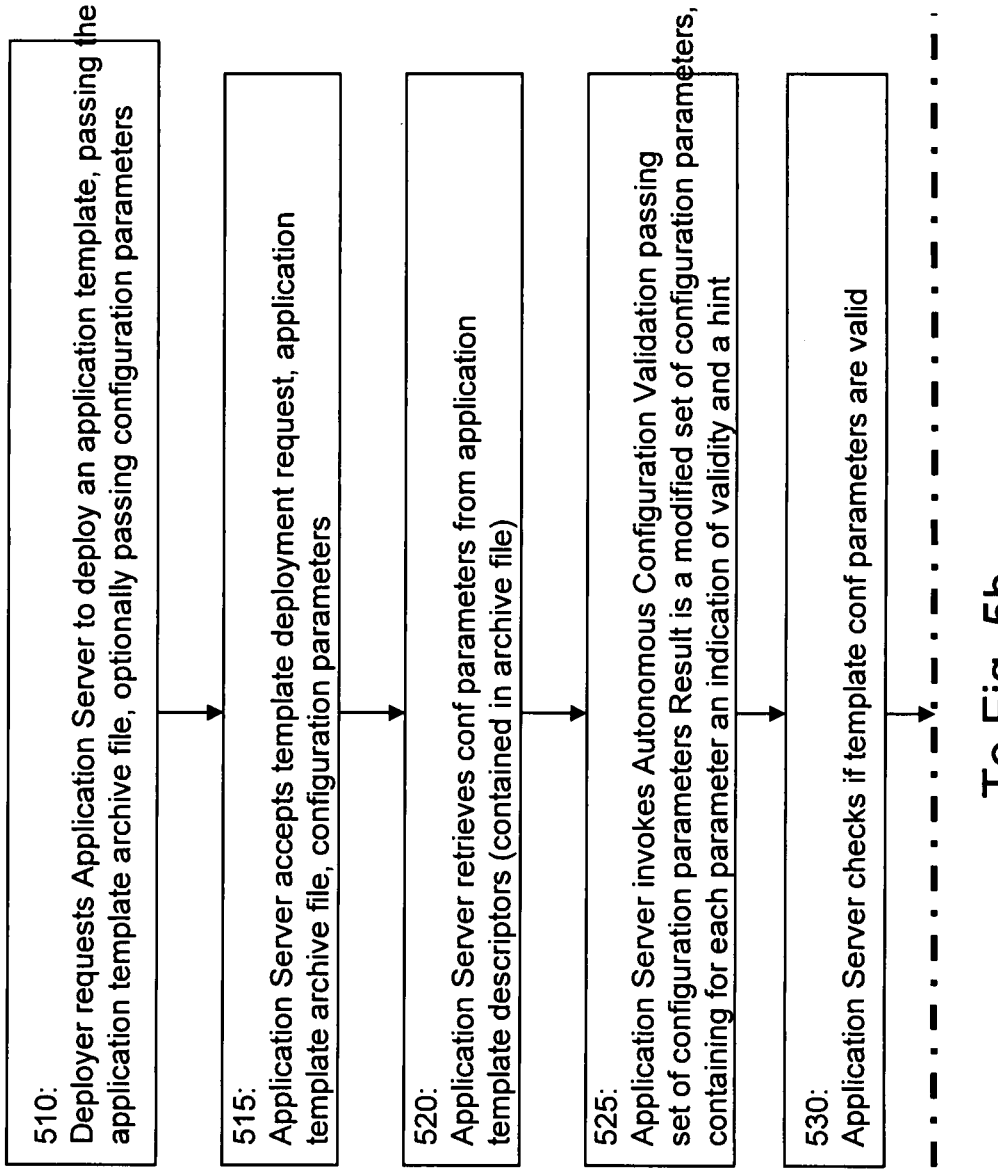

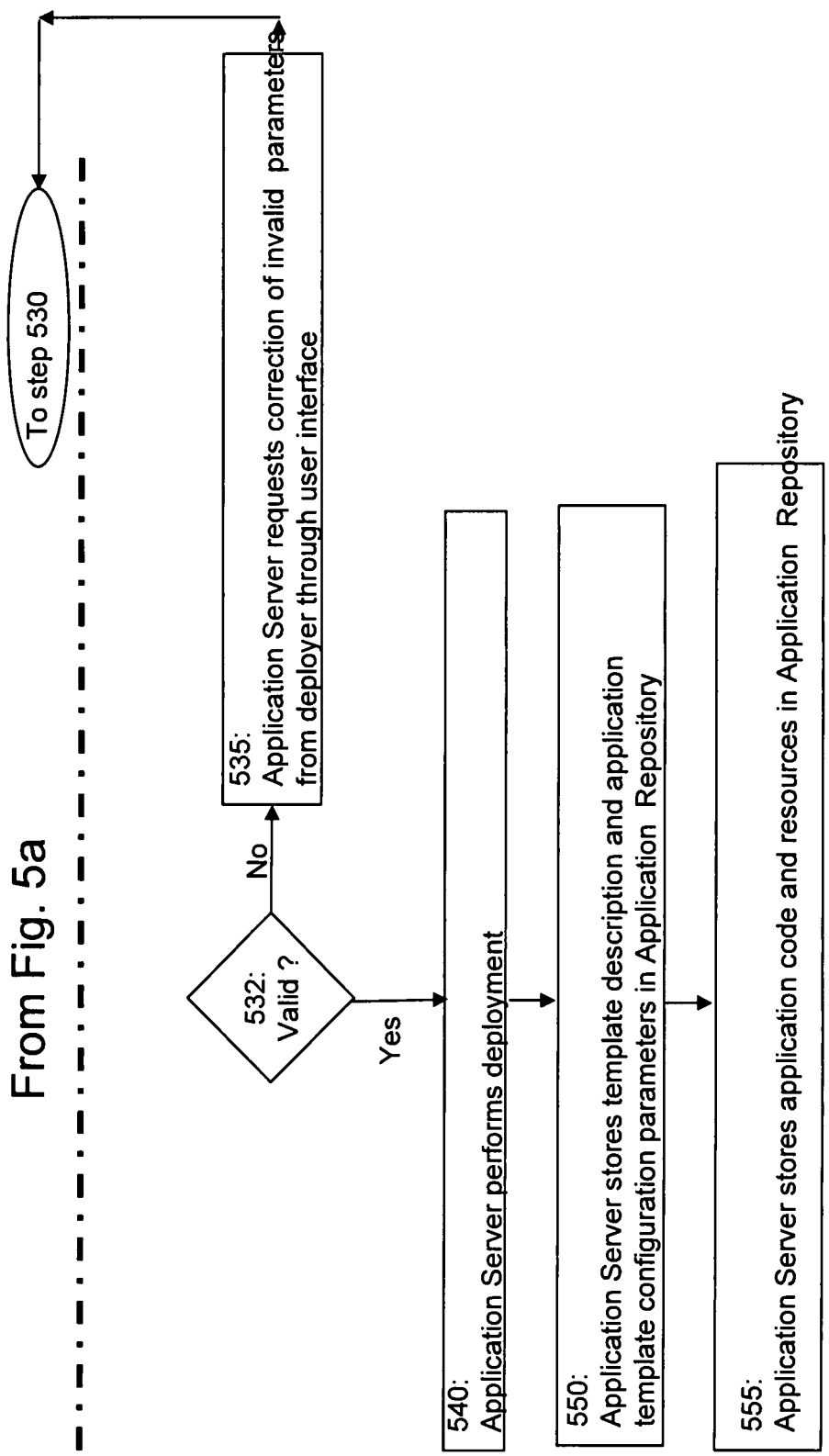

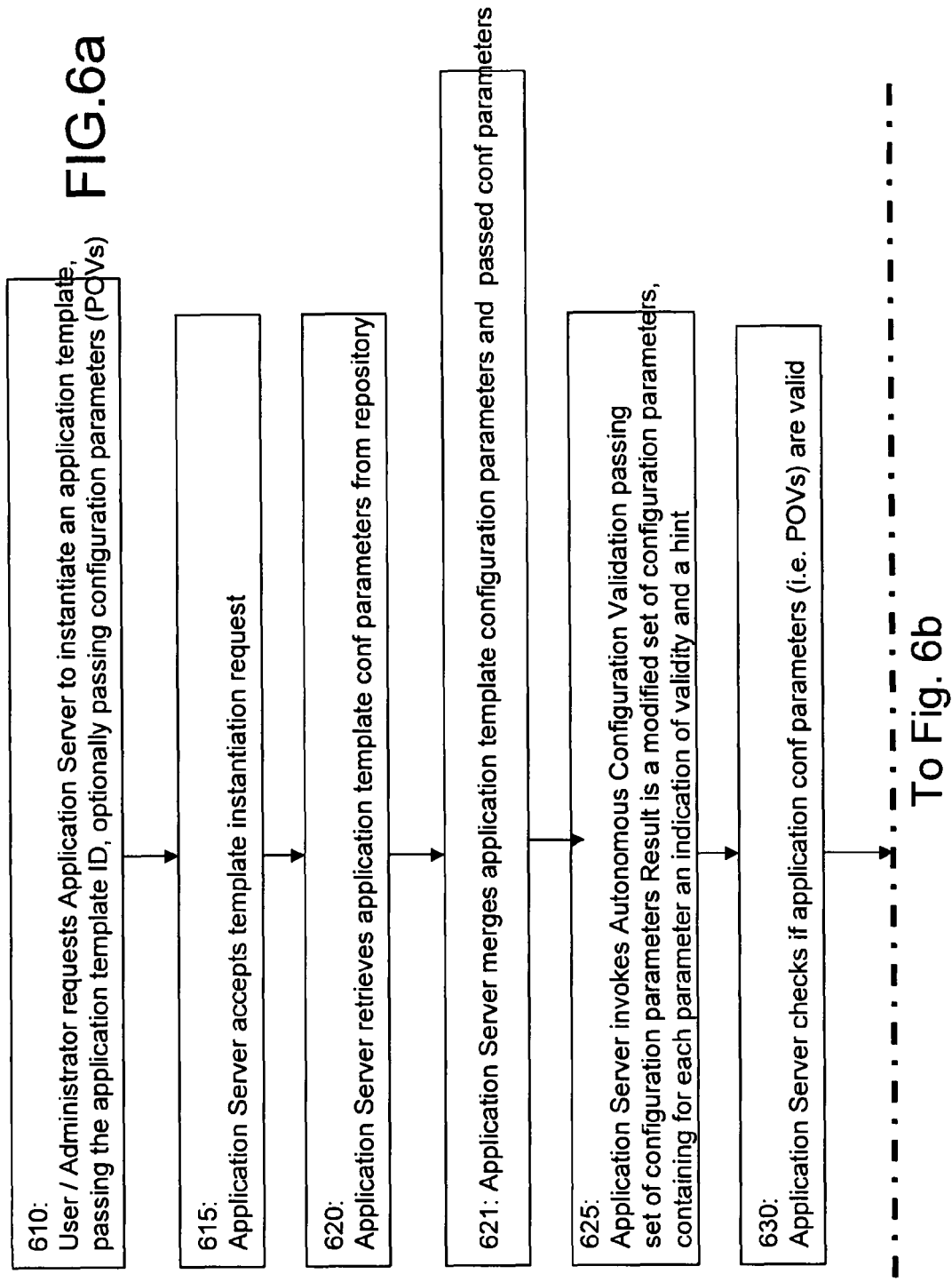

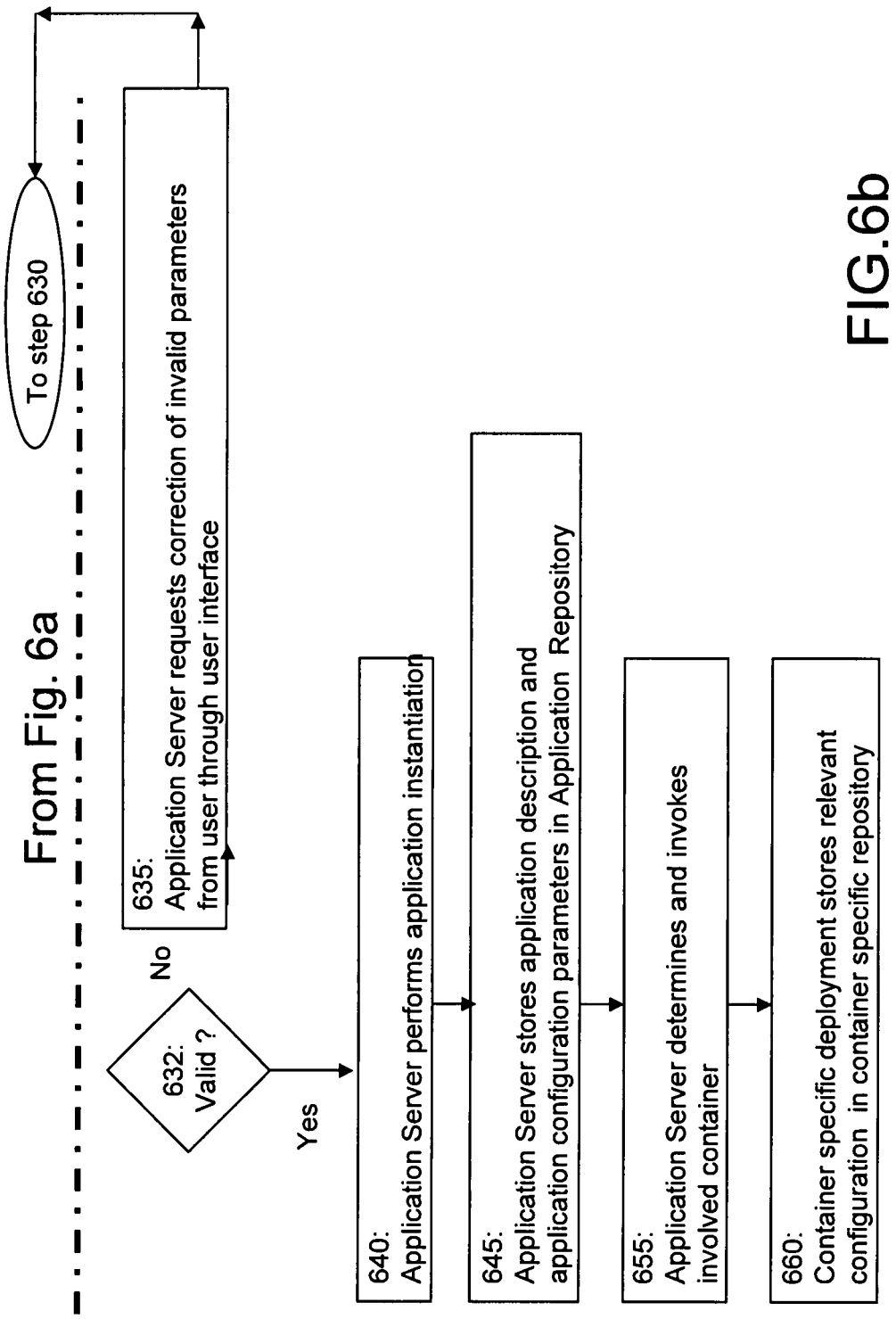

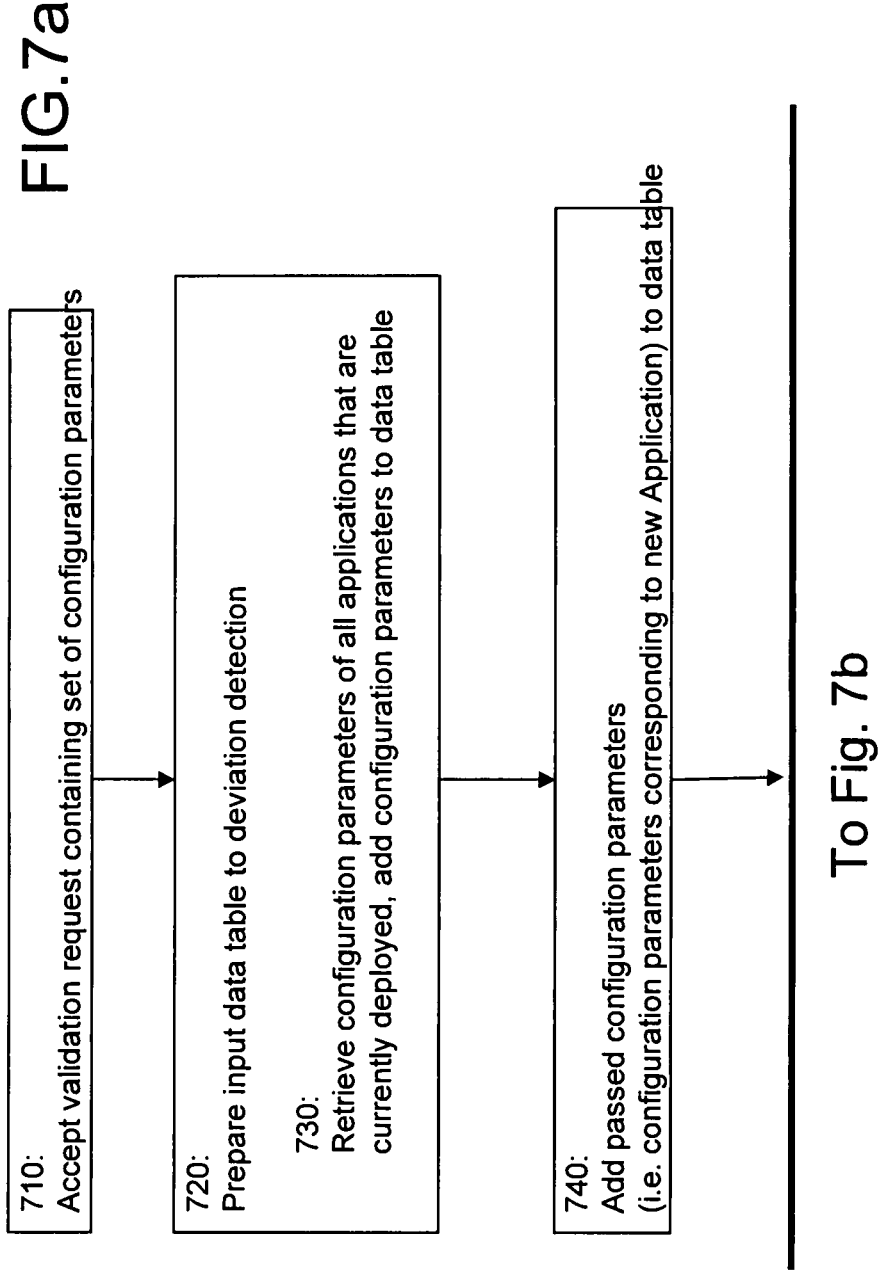

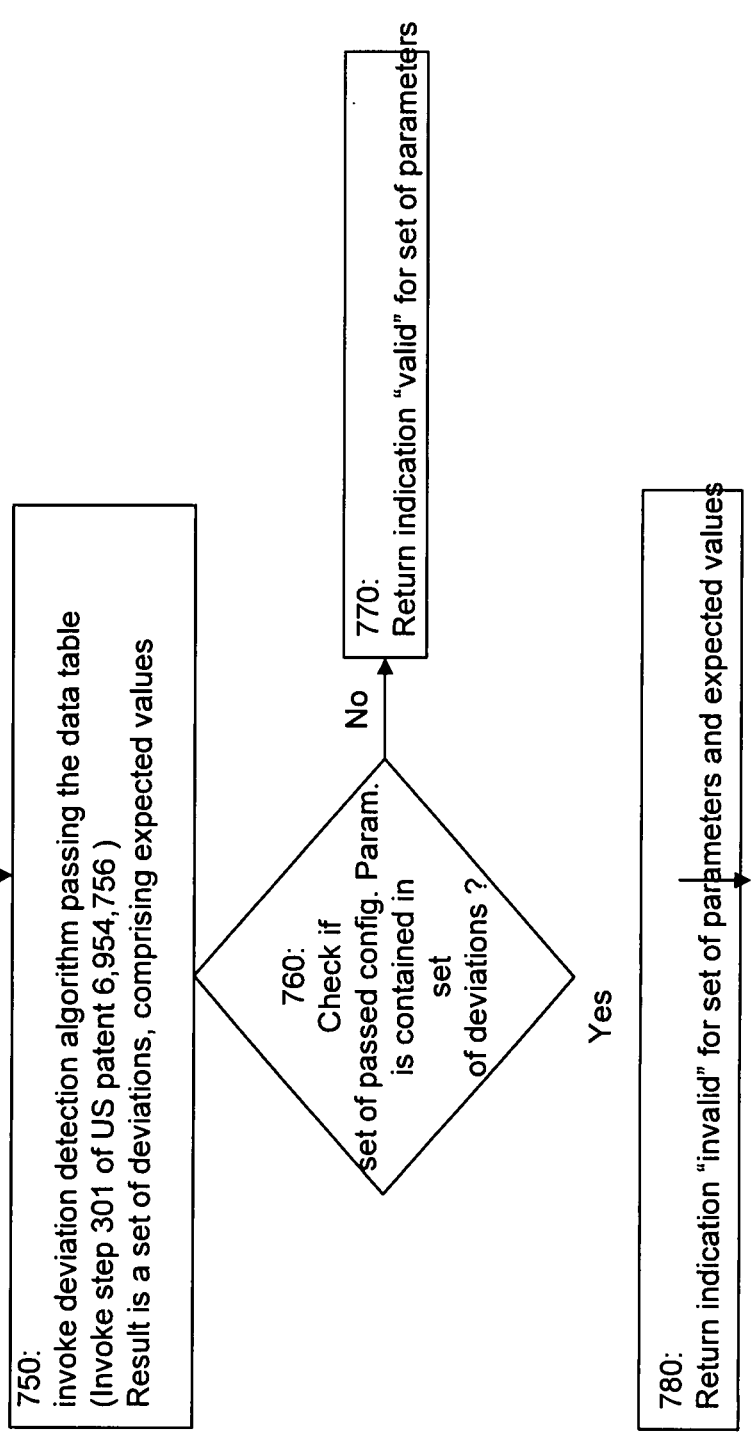

APPLICATION SERVER WITH AUTOMATIC AND AUTONOMIC APPLICATION CONFIGURATION VALIDATION

BACKGROUND OF THE INVENTION

Field of the Invention

The present invention relates to the field of network computing. In particular, the present invention relates to a method and respective system for configuring an application program during its deployment in a network ready to be accessed by a remote client application via a network protocol such as TCP/IP, wherein an application server processes a plurality of application components, and wherein the application program is based on an application template comprising the executable code of the application program, which template is configurable at least in part by an end-user by specifying a plurality of user-specific data defining the user-specific attributes adapting the application program to the needs of a specific end-user, for generating a user-specific application runtime instance.

Related Art

With reference to FIG. 1, there is illustrated the basic structural components of a prior art application server. The application server 10 (e.g., IBM WebSphere) is a software program executed on a server computer on a computer network dedicated to running certain software applications accessible by a client application via a network access.

The application server 10 provides a runtime environment for these applications. It also provides support for deploying an application, managing the resource requirements for an application, ensuring the availability, isolation, and protection of an application from other applications and their resource requirements, and monitoring and securing the application.

Generally, an application shall be understood to comprise one or more application components and to include application code and application resources, such as, for example:

Web applications containing J2EE components such as servlets and JSPs, code that can be executed by the application server, resources such as HTML pages, graphic files, etc.; and Enterprise applications containing among other things J2EE components such as Enterprise Java Beans (EJBs), executable code, as well as web applications.

Typically an application server supports different types of application components.

The container, e.g., the web container 18 or the portlet container 20, provides means for executing and invoking an application component and ensures the optimal organization of component instances in memory, controlling the life cycle and caching of state to achieve the highest levels of efficiency and integrity, protecting access to the components, and handling the complexities of communication, distribution, and addressing.

An application can be packaged into an application archive that contains application code, resources, and one or more application deployment descriptors that specify component specific application metadata. The packaging makes it possible to transfer, copy, multiply, clone and exchange the application between computers and to deploy the application to an application server.

Deployment is performed in a dedicated software component 16. This comprises basically the step of installing the application on the target application server, which includes configuration steps if necessary, and making that application available for execution. Deployment adds the application to the application server repository and adapts the application server configuration. Typically deployment is initiated by a human deployer (a user or an administrator) by use of a user interface 12 or an input file containing the relevant deployment options. The application server may also offer a deployment API 14 by which dedicated third party deployment tools may access the deployment functionality.

The deployment functionality establishes the application configuration, i.e., the parameters defining the application installation options and the runtime behavior. The deployment configuration is based on an application deployment descriptor and the settings specified by the deployer during deployment via the user interface or an API (during deployment the deployer may manually change or create selected parameters). The application server will persist this deployment configuration and later on use it during runtime.

Next, a simple example (an application "Email") is given to improve clarity. The sample application server supports four types of configuration parameters:

Application name;
Application server instance;
Virtual host; and
Context root.

These items are parameters relevant for deployment and determine:

The application name that is presented to the user or administrator, e.g., "Email";

The logical application server instance that executes the application, e.g., "server1";

The virtual host, an abstraction for the HTTP context where the application is made available to users. For example, a virtual host is associated with an IP port, e.g., port 9080.

The context root determines the URL by which the application is available, e.g., "/email".

After deployment, the application is ready to be executed by the application server. That is, the application server may start, run, and finally stop the application on request of an administrator or an application management system. While the application is running, the application server 10 accepts requests for the components of the application and forwards incoming requests to the associated container, i.e., the web container 18 or a portlet container 20. The container then invokes the application component (not depicted) to process the request.

In addition, and with special focus to the present invention, an application server 10 may support the concept of prior art "application templates." An application template itself cannot be executed by the application server directly. In contrast, it can be instantiated into one or multiple applications by users. The application template contains application template configuration, application components, executable code and resources. It may include points of variability (POV), which are customizable, thus user-specific data elements that are filled-in during instantiation. Normally, an administrator or a user performs instantiation of an application template, thereby creating a new application. The application configuration of this instance is derived from the application template configuration, and the values of the POVs which are manually specified by the administrator or user, are specific for this instance.

The POVs of the above sample application template "Email" may include, for example:

User name;
User information (department number, address, etc.);
User location;
Time zone;

Email-address; and
Email-Server.

A user may instantiate the EMail application template by firstly choosing the template in the user interface and secondly specifying the values for the POVs. Thus, a specific application instance is created and configured for this user which contains his personal configuration for name, user information, location, time zone, email address, and email server.

The technical problem underlying to the present invention will now be described.

The above described application deployment and application template instantiation are highly critical processes since they change the application configuration and establish the application runtime behavior. In the prior art, these steps, specifying the application configuration, providing concrete values for the POVs, etc., are performed manually by an administrator or user. This provokes disadvantageously errors in configuration resulting in that the application will not or not properly operate.

Even if an administrator is allowed to manually specify default values or verification rules for configuration parameters and to verify supplied configuration parameters against these values or rules, this represents a serious burden in terms of effort and thus costs in an environment in which a large plurality of applications or of template instances must be configured, which is the case in many enterprise networks. The reason is that this verification must be done manually by respective highly skilled staff.

Requiring a human to manually specify validation rules is already quite difficult and error-prone, since the design of verification rules is highly complex, as the rules have to be precise enough to differentiate correct and incorrect configuration parameters, in particular for cases where a configuration may be highly personalized and specific for a certain system environment.

Therefore, the prior art does not disclose recommendation and verification programs including functions that build on these techniques and help the user or administrator in configuring an application and avoid misconfiguration. Further, disadvantageously, there also is no support in the prior art for fully automatic configuration in an autonomic on-demand scenario.

This problem will only increase in the future, when the application template concept becomes more and more pervasive. Template instantiation must then be performed by end users, who do not have profound administration skills. Without functions for verification incorporated into the application server, this will create software problems and increase software support and helpdesk costs.

SUMMARY OF THE INVENTION

An application server in accordance with the present invention incorporates an Application Configuration Validation (ACV) component that performs autonomic and automatic validation of application configuration parameters which are relevant for one of the group of:
a) application deployment (see FIG. 4);
b) application template deployment (see FIG. 5); and
c) application template instantiation (see FIG. 6).

Thus, the term "application configuration" is to be understood to unify the concepts of configuration during application deployment, or application template instantiation, and application template deployment (see FIG. 3). The application configuration is made up of a set of application configuration parameters.

During deployment of a new application or template, or during application template instantiation, the ACV verifies the supplied configuration parameters against the configuration parameters of already successfully deployed applications or application templates, respectively, and thus recognizes configuration parameter deviations that indicate configuration errors.

The application server invokes the ACV when a new application is to be deployed, or when a new application template is to be deployed, or when an application is to be instantiated by a respective application template instance (optionally also configured by the method of the present invention). The ACV then determines and returns a set of potential invalid configuration parameters as well as expected values for these parameters. ACV input data include the application configuration parameters of the new application, i.e., the configuration parameters that are contained in the application deployment descriptors or are specified by the user or by the administrator during deployment or instantiation.

In accordance with the present invention, an application server performs at configuration runtime, a method for configuring an application element during its deployment in a network, e.g., on a web portal, ready to be accessed by a remote client application, e.g., a web browser processing HTTP requests, or a J2EE client invoking server components via a respective different protocol such as for example SOAP, CORBA or ORB, via a network protocol such as TCP/IP, wherein an application server processes a plurality of application components, e.g., a user API, a GUI, a Java API, script languages, for deployment purposes, a database, messaging products, etc.

A method in accordance with an embodiment of the present invention comprises: a) receiving a deployment request for an application element, wherein the request includes configuration parameters that are specific for an instance of the application element (e.g., simply by entering the parameters via a respective end-user interface); b) extracting the instance-specific configuration parameters from the request, c) automatically retrieving further configuration parameters associated with the application from a datastore accessible to the application server (e.g., from a template, or from a deployment descriptor); d) merging the instance-specific configuration parameters and the further configuration parameters; e) preparing a data object by inserting the merged configuration parameters; f) retrieving from a datastore the configuration parameters of application instances that are currently deployed in the application server; g) inserting these configuration parameters into the data object; h) invoking a data mining based deviation detection algorithm passing the data object; i) receiving an output of the deviation detection algorithm; j) if at least one of the configuration parameters associated with the application is marked as a deviation in the deviation detection algorithm output, issuing an indication to the user; k) otherwise creating an application element instance; and l) storing a description of the application element instance and the configuration parameters of the application element instance in the datastore.

An application element in the context of the present invention is to be understood as an application or an application template. An application element may comprise one or multiple application components.

User-specific configuration parameters can be generated at the user site: locally at the user site, e.g., directly typed-in by the user, or copy-pasted by the user, or by a program, or remotely generated elsewhere and transferred to the user site.

This enables advantageously the following use case for the present invention. During deployment the application server is able to verify user specified application configuration parameters, and the ACV determines potential erroneous configuration parameters. The application server either displays a warning message (thus requesting the user to correct the erroneous parameters) or notifies an administrator. The application server may also log the event; if the user specified parameters later cause a runtime error, the log helps in finding the error.

The present invention provides numerous advantages over the prior art. For example, the present invention improves usability and lowers helpdesk costs. This is especially important when the concept of application templates is more broadly accepted and the instantiation operation is performed by "normal" (i.e., not specially trained) users. Further, the present invention lowers the number of problems caused by software misconfiguration. In addition, the system does not rely on a human user specifying any verification rule, e.g., a grammar or a syntactical rule, or any recommendation rule. In contrast, the present invention automatically and autonomously finds deviations by analysis of available application configuration.

BRIEF DESCRIPTION OF THE DRAWINGS

These and other features of the present invention will be more readily understood from the following detailed description taken in conjunction with the accompanying drawings.

FIG. 3 illustrates several use cases in accordance with the present invention.

FIG. 4, comprising FIGS. 4a, 4b, illustrates the control flow during application deployment in accordance with an embodiment of the present invention.

FIG. 5, comprising FIGS. 5a, 5b, illustrates the control flow during application template deployment in accordance with an embodiment of the present invention.

FIG. 6, comprising FIGS. 6a, 6b, illustrates the control flow during application template instantiation in accordance with an embodiment of the present invention.

FIG. 7, comprising FIGS. 7a, 7b, illustrates details of the control flow of 430 in FIG. 4.

DETAILED DESCRIPTION OF THE INVENTION

Figure 1:
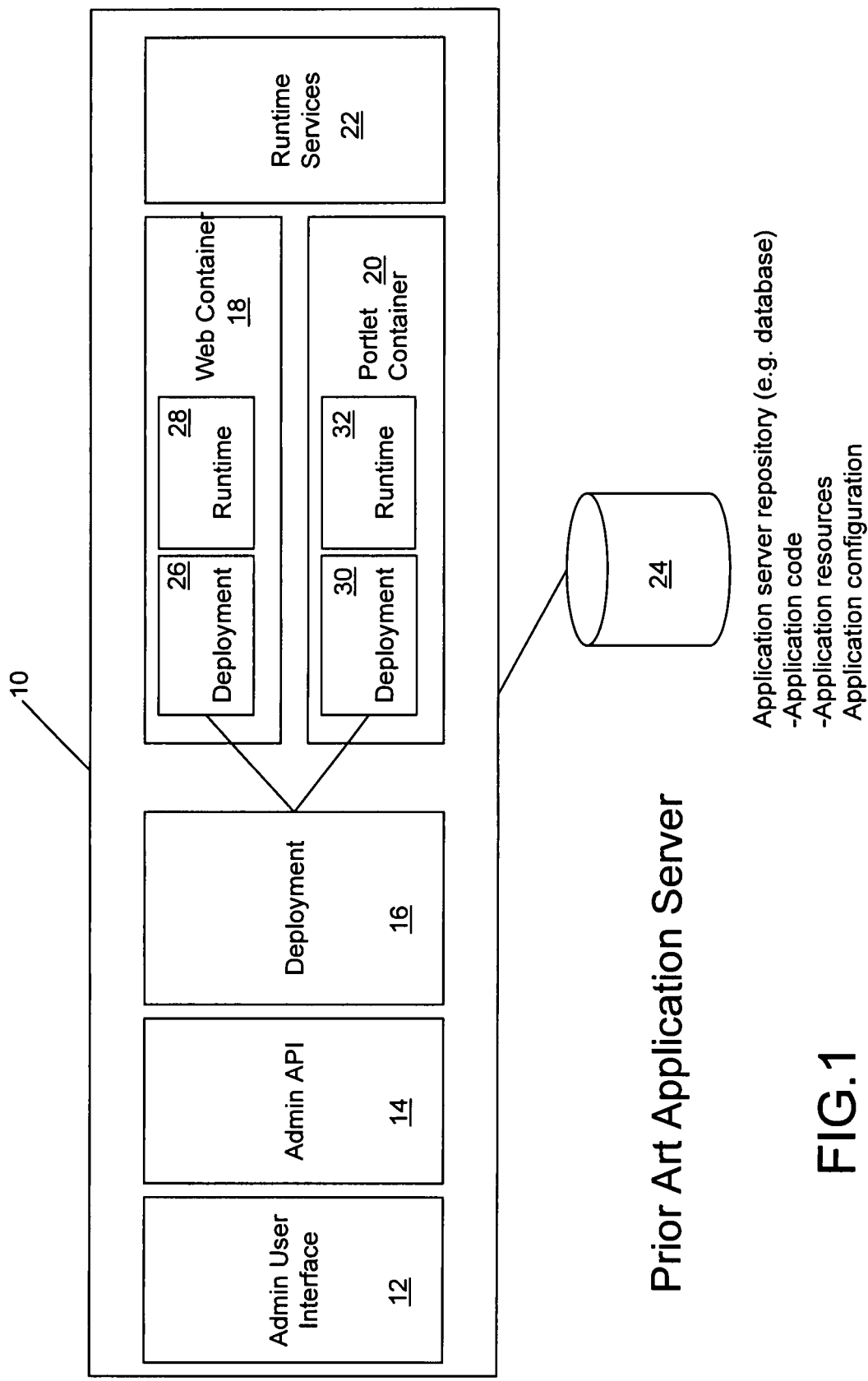
FIG. 1 illustrates the basic structural components of a prior art application server used for a prior art method.
Figure 2:
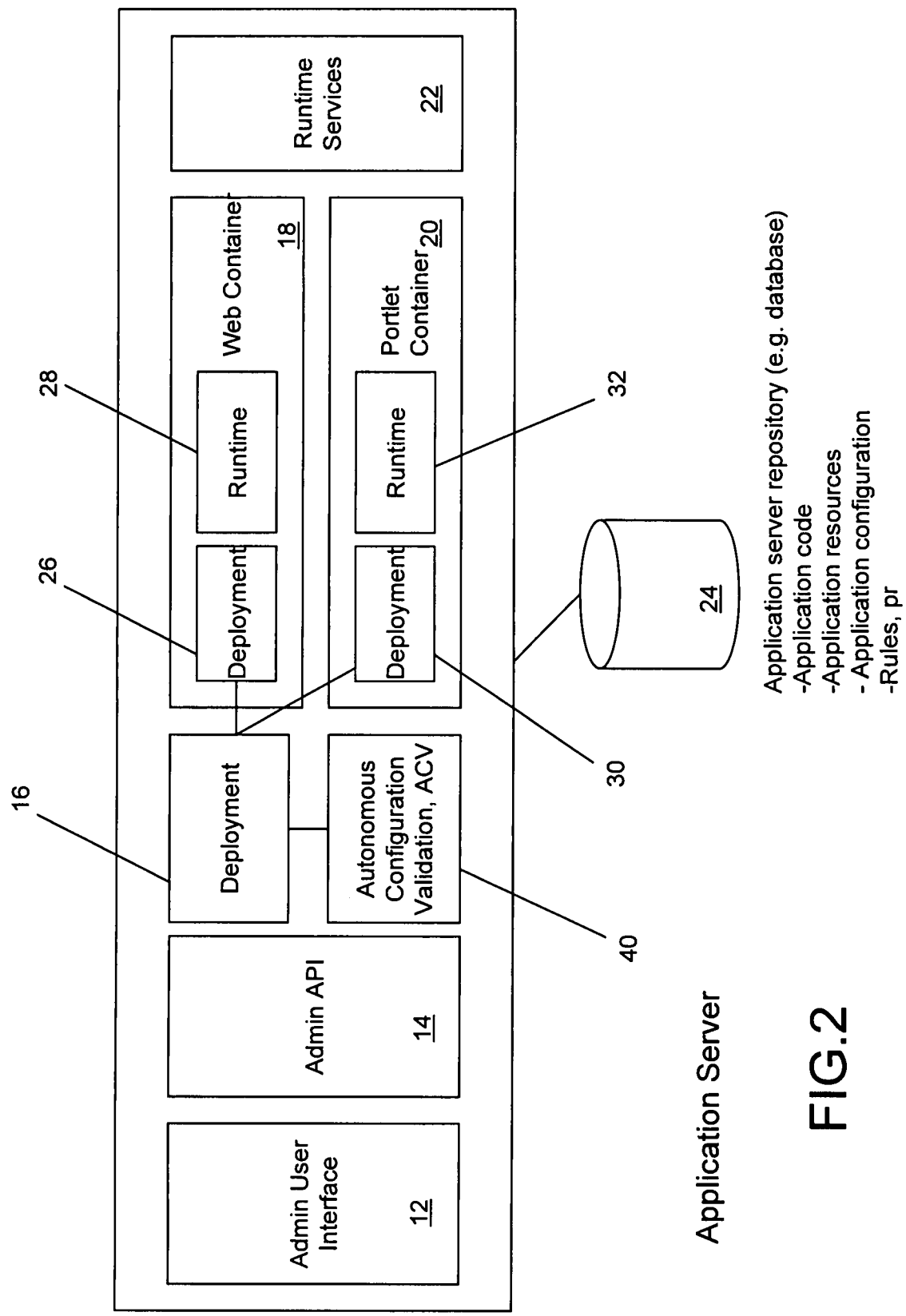
FIG. 2 illustrates the basic structural components of an application server in accordance with an embodiment of the present invention.

FIG. 2 depicts a software and hardware environment in accordance with an embodiment of the present invention, which includes a software component 40, referred to as Autonomic Configuration Validation (ACV) component. This ACV component 40 has a functional interface to the prior art deployment component 16, as it was described above. The ACV component 40 performs the validation of configuration parameters according to the control flow depicted in FIGS. 4, 5, and 6 (different application use cases) and with a detailed zoom view given in FIG. 7. The ACV component 40 can be implemented in software and has operational interfaces to a database (e.g., database 24 or a separate database) in order to store relevant data necessary for it to operate.

FIG. 3 illustrates several use cases in accordance with the present invention. The application element in question can be an application template 310 or an application itself 350. Further, the application element can be an application template instance, and the deployment includes the instantiation of an application itself 330. In the end of deployment, there is always an application instance, 340, 360.

FIG. 4 illustrates the control flow during application deployment in accordance with an embodiment of the present invention. In 410, a deployer (a human) invokes the application server to deploy an application, either via the Admin user interface or through a script or program via the Administrative API. The deployer provides the application archive file, and optionally specifies further application configuration parameters. In 415, the application server accepts the deployment request, which may contain or reference the application archive file as well as further application configuration parameters.

In 420, the application server retrieves the application configuration parameters that are contained in the application descriptor files that are included in the application archive. These model parameters and in addition those parameters contained in the request originating from the deployer constitute the applications configuration parameters.

In 425, the application server invokes the Autonomous Configuration Validation (ACV) and passes the set of application configuration parameters and a null application template identifier to indicate that the application is not based on a template. The details of operation are described with reference to FIG. 7 below. The response returned by ACV specifies if the set of configuration parameters is found to be valid or invalid as well as a hint. If a configuration parameter is indicated to be invalid, the hint specifies an expected value computed by ACV.

In 430, the application server checks if the configuration parameters are indicated to be valid. If the configuration parameters are deemed to be invalid in 432, the application server requests correction of the parameters through the administration user interface or, if deployment was requested through the admin API, indicates the invalidity of the passed configuration parameters in 435, for example by throwing an exception.

The application server marks the invalid parameter in the user interface and displays a hint preferably containing one or more expected values. The administrator or user then may accept a value proposed in the hint or may change other values. The result is a set of corrected configuration parameters.

Using this set of configuration parameters the application server performs application deployment in 440. In more detail, the application server stores the application descriptor and the application configuration parameters in the repository in 445. This allows retrieval of the application configuration when the application is started, is invoked, or is modified through the administrator user interface (Admin UI).

In addition, in 450, the application server stores the application code and the application resources in the application repository. This allows access to the code and resources during runtime.

In 460, the application server determines the involved containers, i.e., the containers that are responsible for the application components and invokes the container's deployment function. The container then performs additional deployment in 465, e.g., by storing container relevant configuration in container specific repositories or by registering the application component in container specific data structures. This enables the container to execute the application components.

In this embodiment, the method is implemented in the application server, outside of any container. Thus, existing containers do not need to be changed. In a variation of this concept, the software module 40 can also be implemented elsewhere, for example, in a container. In this case, in 460, the container deployment invokes the ACV when performing the container specific additional deployment.

FIG. 5 illustrates the control flow during application template deployment in accordance with an embodiment of the present invention. The basic procedure of 510 to 555 is analogous to the procedure given in FIG. 4. There is no container-specific deployment.

FIG. 6 illustrates the control flow during application template instantiation in accordance with an embodiment of the present invention. In 610, a user or an administrator requests the application server to instantiate an application template, including passing the application template ID, and optionally passing configuration parameters (POVs). Then, in 615, the application server accepts the template instantiation request, and retrieves the application template configuration parameters from the repository in 620.

The template may comprise points of variability (POVs), which are configuration parameters that are usually specified during instantiation by the person who requests instantiation. Note that the template may comprise configuration parameters, the values of which are specified during template deployment and are associated with the template. In contrast, the values of the POVs are specified during template instantiation and are associated with one application instance. Thus, the application instance configuration is made up of the template configuration parameters plus the POV values. Further, it merges the template configuration parameters and the passed configuration parameters (POV values) in 621, yielding the application instance configuration parameters.

In 625, the application server invokes ACV during template instantiation in order to validate the application instance configuration. The application server invokes ACV passing these application instance configuration parameters.

FIG. 7 illustrates details of the control flow of 430 in FIG. 4. In FIG. 7, the ACV 40 accepts validation requests that contain a set of configuration parameters, which are to be validated, as well as an application template identifier, in 710. The application template identifier denotes the application template the application is based on. If the application is not based on a template, a null value is passed.

In 720, the ACV prepares a data table representing input data for the deviation detection algorithm. If the passed application template identifier is null, i.e., the application is not based on a template, the ACV creates a data structure containing attributes for all common application configuration parameter, common to all applications operated by the application server, and reads the configuration of all applications from the repository, storing the read configuration parameters in 730 in the data table.

If the passed application template identifier is not null, in 730, the ACV reads the respective application template, analyses the POV definition, prepares a data structure containing attributes for all application template configuration parameters and POVs, reads the configuration parameters of all those application instances based on this application template, and stores the read configuration parameters in the data table.

Thus, the data table finally contains application configuration parameters of relevant application instances that are deployed to the application server. Then, in 740, the ACV adds the application configuration parameters that are passed to this data table. For example, see the data table, relating to the present example:
X, Y, Z refer to instantiated applications of users;
"Timo" refer to the passed configuration parameters.

| User name | User information | User location | Time zone | Email address | Email server |
|---|---|---|---|---|---|
| Timo | 0575 | Boeblingen | GMT | user@mail.de | Email.de |
| X | 0575 | Boeblingen | GMT + 1 | X@mail.de | Mail.de |
| Y | 0645 | Stuttgart | GMT + 1 | y@mail.de | Mail.de |
| Z | 0645 | Stuttgart | GMT + 1 | Z@mail.de | Mail.de |

This data table is a tabular representation of the configuration parameters, where a record contains the configuration parameters of one application instance. Of course, other storage representations can be implemented.

In 750, a deviation detection algorithm is invoked and the data table is referenced in this invocation. For this purpose, for example, the step 301 of U.S. Pat. No. 6,954,756 can be invoked. The disclosure of this patent application is incorporated herein by reference. The deviation detection algorithm will return a set of deviations, i.e., a data structure referencing the records in the data table that are found to represent deviations. The deviation detection algorithm may also return a set of expected values for each deviation. At the end of deviation detection in 750, it is checked in 760 if the record corresponding to the set of passed configuration parameters is contained in the set of deviation. If not, then in 770 a "valid" indication is returned for this set of parameters. Otherwise, see the YES-branch of 760, an "invalid" indication is returned for these set of error parameters, whereas preferably a set of expected values is also returned.

In an embodiment of the invention, the ACV component 40 includes a data mining based deviation detection component, which is per se known from prior art.

In the deviation detection in 750, a prior art approach can be used as it is disclosed in U.S. Pat. No. 6,954,756. This prior art disclosure relates to means and a method for automatically detecting deviations in a data table comprising a multitude of records and a multitude of columns. It detects deviations in a large database and does not require a metrical distance function having certain properties regarding the metrical distance between data elements in the database or some type of dissimilarity function allowing one to identify subsets of data items showing a significant dissimilarity in terms of this function with respect to the rest of the data items.

This prior art method contemplates selecting a column of the data table as a classification column and calculating a classification tree with respect to the classification column. Each edge of the classification tree is associated with a predicate. The leaf nodes of the classification tree are associated with a leaf record set comprising the subset of records for which the class predicate, comprising all predicates along a path from a root node of the classification tree to the leaf nodes, evaluates to TRUE. Moreover, leaf nodes are associated with a leaf label representing an expected value in the classification column for the corresponding leaf record sets. From the leaf record sets all records deviating with respect to the corresponding classification column from the leaf label are determined as deviation sets. The deviation sets are associated with the corresponding class predicates as an explanation for being detected as a deviation.

This prior art teaching allows to achieve the objective mentioned above. In particular it is worth to note that no "a priori" knowledge needs to be required to execute the proposed teaching regardless if the knowledge be in the form of any type of metrical distance function or similarity function, or in the form of additional external information such as integrity constraints or some type of preformulated hypothesis or the like. Due to this property this prior art teaching may be applied to any type of item set independently of and not knowing the nature of the data to be examined; the teaching is self-adapting with respect to the nature of the item set.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the preferred embodiments of this invention has been presented for purposes of illustration and description. It is not intended to be exhaustive or to limit the invention to the precise form disclosed, and obviously, many modifications and variations are possible.

The invention claimed is:

1. A method performed by an application server for configuring an application element during deployment in a network ready to be accessed by a remote client application via a network protocol, wherein an application server processes a plurality of application components, comprising:
   receiving a deployment request for the application element, wherein the request includes configuration parameters that are specific for an instance of the application element;
   extracting the instance-specific configuration parameters from the request;
   automatically retrieving further configuration parameters associated with the application element from a datastore accessible to the application server;
   merging the instance-specific configuration parameters and the further configuration parameters;
   preparing a data object by inserting the merged configuration parameters;
   retrieving from a datastore configuration parameters of application instances that are currently deployed in the application server;
   inserting the configuration parameters into the data object;
   invoking a data mining based deviation detection algorithm passing the data object, the data mining based deviation detection algorithm verifying the merged configuration parameters against the configuration parameters of application instances that are currently deployed in the application server to determine configuration parameter deviations that indicate configuration errors;
   receiving an output of the deviation detection algorithm;
   if at least one of the configuration parameters associated with the application element is marked as a deviation, issuing an indication to a user;
   otherwise creating an application element instance;
   storing a description of the application element instance and the configuration parameters of the application element instance in the datastore; and
   in case an error is detected, sending back a request to an end-user including an error-prone instance specific parameter and a respective expected parameter for the error-prone instance specific parameter with a prompt for the end-user to input a correction of the error-prone instance specific parameter, wherein the respective expected parameter comprises a specific computed expected value for the error-prone instance specific parameter.

2. The method according to claim 1, wherein the application element is an application template.

3. The method according to claim 1, wherein the application element is an application.

4. The method according to claim 1, wherein the application element is an application template instance and wherein the deployment includes an instantiation of an application.

5. The method according to claim 1, further comprising:
   assessing a relevance of a detected difference; and
   issuing a qualified hint including a comment qualifying a severity of the detected difference.

6. An electronic data processing system performed by an application server for configuring an application element during deployment in a network ready to be accessed by a remote client application via a network protocol, wherein an application server processes a plurality of application components, comprising:

at least one computer device including;
a system for receiving a deployment request for the application element, wherein the request includes configuration parameters that are specific for an instance of the application element;
a system for extracting the instance-specific configuration parameters from the request;
a system for automatically retrieving further configuration parameters associated with the application element from a datastore accessible to the application server;
a system for merging the instance-specific configuration parameters and the further configuration parameters;
a system for preparing a data object, by inserting the merged configuration parameters;
a system for retrieving from a datastore configuration parameters of application instances that are currently deployed in the application server;
a system for inserting the configuration parameters into the data object;
a system for invoking a data mining based deviation detection algorithm passing the data object, the data mining based deviation detection algorithm verifying the merged configuration parameters against the configuration parameters of application instances that are currently deployed in the application server to determine configuration parameter deviations that indicate configuration errors;
a system for receiving an output of the deviation detection algorithm;
a system for issuing an indication to a user if at least one of the configuration parameters associated with the application element is marked as a deviation, or for creating an application element instance if none of the configuration parameters associated with the application element is marked as a deviation;
a system for storing a description of the application element instance and the configuration parameters of the application element instance in the datastore; and
wherein in case an error is detected, sending back a request to an end-user including an error-prone instance specific parameter and a respective expected parameter for the error-prone instance specific parameter with a prompt for the end-user to input a correction of the error-prone instance specific parameter, wherein the respective expected parameter comprises a specific computed expected value for the error-prone instance specific parameter.

7. A program product stored on a non-transitory computer readable medium, which when executed, configures an application element during deployment, the computer readable medium comprising program code for:
receiving a deployment request for an application element, wherein the request includes configuration parameters that are specific for an instance of the application element;
extracting the instance-specific configuration parameters from the request;
automatically retrieving further configuration parameters associated with the application element from a datastore accessible to an application server;
merging the instance-specific configuration parameters and the further configuration parameters;
preparing a data object by inserting the merged configuration parameters;
retrieving from a datastore configuration parameters of application instances that are currently deployed in the application server;
inserting the configuration parameters into the data object;
invoking a data mining based deviation detection algorithm passing the data object, the data mining based deviation detection algorithm verifying the merged configuration parameters against the configuration parameters of application instances that are currently deployed in the application server to determine configuration parameter deviations that indicate configuration errors;
receiving an output of the deviation detection algorithm;
if at least one of the configuration parameters associated with the application element is marked as a deviation, issuing an indication to a user;
otherwise creating an application element instance;
storing a description of the application element instance and the configuration parameters of the application element instance in the datastore; and
wherein in case an error is detected, sending back a request to an end-user including an error-prone instance specific parameter and a respective expected parameter for the error-prone instance specific parameter with a prompt for the end-user to input a correction of the error-prone instance specific parameter, wherein the respective expected parameter comprises a specific computed expected value for the error-prone instance specific parameter.

8. The system of claim 6, wherein the application element is an application template.

9. The system of claim 6, wherein the application element is an application.

10. The system of claim 6, wherein the application element is an application template instance and wherein the deployment includes an instantiation of an application.

11. The system of claim 6, further comprising:
a system for assessing a relevance of a detected difference; and
a system for issuing a qualified hint including a comment qualifying a severity of the detected difference.

12. The program product of claim 7, wherein the application element is an application template.

13. The program product of claim 7, wherein the application element is an application.

14. The program product of claim 7, wherein the application element is an application template instance and wherein the deployment includes an instantiation of an application.

15. The program product of claim 7, further comprising program code for:
assessing a relevance of a detected difference; and
issuing a qualified hint including a comment qualifying a severity of the detected difference.

16. The method according to claim 1, wherein the instance-specific configuration parameters comprise points of variability specified during application instantiation by a user requesting the application instantiation, and wherein the further configuration parameters associated with the application element are associated with an application template and are specified during deployment of the application template.

* * * * *